United States Patent
Kim et al.

(10) Patent No.: US 10,498,271 B2
(45) Date of Patent: Dec. 3, 2019

(54) SYSTEM AND METHOD FOR AN INTEGRATED CONTROL SYSTEM FOR A DIESEL GENERATING SET

(71) Applicant: BASLER ELECTRIC COMPANY, Highland, IL (US)

(72) Inventors: Kiyong Kim, Collinsville, IL (US); Jeffrey A. Burnworth, Swansea, IL (US)

(73) Assignee: Basler Electric Company, Highland, IL (US)

( * ) Notice: Subject to any disclaimer, the term of this patent is extended or adjusted under 35 U.S.C. 154(b) by 0 days.

(21) Appl. No.: 16/079,643

(22) PCT Filed: Feb. 27, 2017

(86) PCT No.: PCT/US2017/019745
§ 371 (c)(1),
(2) Date: Aug. 24, 2018

(87) PCT Pub. No.: WO2017/147595
PCT Pub. Date: Aug. 31, 2017

(65) Prior Publication Data
US 2019/0052209 A1    Feb. 14, 2019

Related U.S. Application Data

(60) Provisional application No. 62/299,774, filed on Feb. 25, 2016.

(51) Int. Cl.
*H02P 9/04* (2006.01)
*H02P 9/10* (2006.01)
(Continued)

(52) U.S. Cl.
CPC ................ *H02P 9/04* (2013.01); *F02B 63/04* (2013.01); *F02D 31/007* (2013.01);
(Continued)

(58) Field of Classification Search
CPC .... H02P 9/04; H02P 9/10; F02B 63/04; F02D 31/007; F02D 41/083; F02D 41/1404; G05B 19/0425
See application file for complete search history.

(56) References Cited

U.S. PATENT DOCUMENTS 5,043,911 A * 8/1991 Rashid ............... G05B 19/0423
                                                    700/287
2004/0008010 A1 * 1/2004 Ebrahim ................... H02P 9/04
                                                    322/44
(Continued)

OTHER PUBLICATIONS

International Search Report of corresponding PCT application No. PCT/US2017/019745 dated May 16, 2017.

*Primary Examiner* — Viet P Nguyen
(74) *Attorney, Agent, or Firm* — Sandberg Phoenix & von Gontard P.C.

(57) ABSTRACT

An integrated control system and method which improves load application/rejection performance for diesel generating sets is disclosed. Feedback-linearizing control is used for voltage regulation, which removes interaction between automatic voltage regulation and speed regulation. A proper feed-forward signal is sent to the governor using load anticipation control. The integrated control reduces engine speed and voltage deviations. It is implemented in the voltage regulator, since it recognizes load changes before the engine. The integrated control helps the engine anticipate throttle adjustments in advance of load being recognized by the engine. Test results show an improvement in engine speed recovery after a large increase or decrease in load.

30 Claims, 9 Drawing Sheets

(51) Int. Cl.
    *F02B 63/04*     (2006.01)
    *F02D 31/00*     (2006.01)
    *F02D 41/08*     (2006.01)
    *F02D 41/14*     (2006.01)
    *G05B 19/042*    (2006.01)
    *H02P 9/02*      (2006.01)

(52) U.S. Cl.
    CPC ....... *F02D 41/083* (2013.01); *F02D 41/1404* (2013.01); *G05B 19/0425* (2013.01); *H02P 9/10* (2013.01); *F02D 2041/141* (2013.01); *F02D 2041/1409* (2013.01); *H02P 9/02* (2013.01)

(56) References Cited

U.S. PATENT DOCUMENTS

| | | | |
|---|---|---|---|
| 2006/0082936 A1* | 4/2006 | Ye | H02J 3/38 |
| | | | 361/38 |
| 2007/0121354 A1* | 5/2007 | Jones | H02M 5/4585 |
| | | | 363/47 |
| 2008/0006236 A1* | 1/2008 | Yamashita | F02D 41/021 |
| | | | 123/198 R |
| 2010/0185336 A1 | 7/2010 | Rovnyak | |
| 2014/0225575 A1* | 8/2014 | Andrejak | H02P 9/04 |
| | | | 322/28 |
| 2016/0025023 A1* | 1/2016 | Kim | F02D 41/083 |
| | | | 701/22 |

\* cited by examiner

SYSTEM AND METHOD FOR AN INTEGRATED CONTROL SYSTEM FOR A DIESEL GENERATING SET

CROSS-REFERENCE TO RELATED APPLICATION

This application claims priority to U.S. National Stage application under 35 U.S.C. § 371 of International Appl. No. PCT/US2017/019745, filed Feb. 27, 2017, and to U.S. Provisional Patent Application No. 62/299,744, filed Feb. 25, 2016, both of which are incorporated herein by reference.

TECHNICAL FIELD

The present disclosure relates to alternating current power generators and, more specifically, to a system and method for an integrated control system for a diesel generating set.

BACKGROUND ART

Generating sets (gensets) are used to provide electricity for distributed power generation systems which include prime power, standby generation, and network support. De-regulation of electric utilities has resulted in many customers utilizing their standby diesel gensets to improve power quality or avoid peak electricity tariffs.

Figure 1:
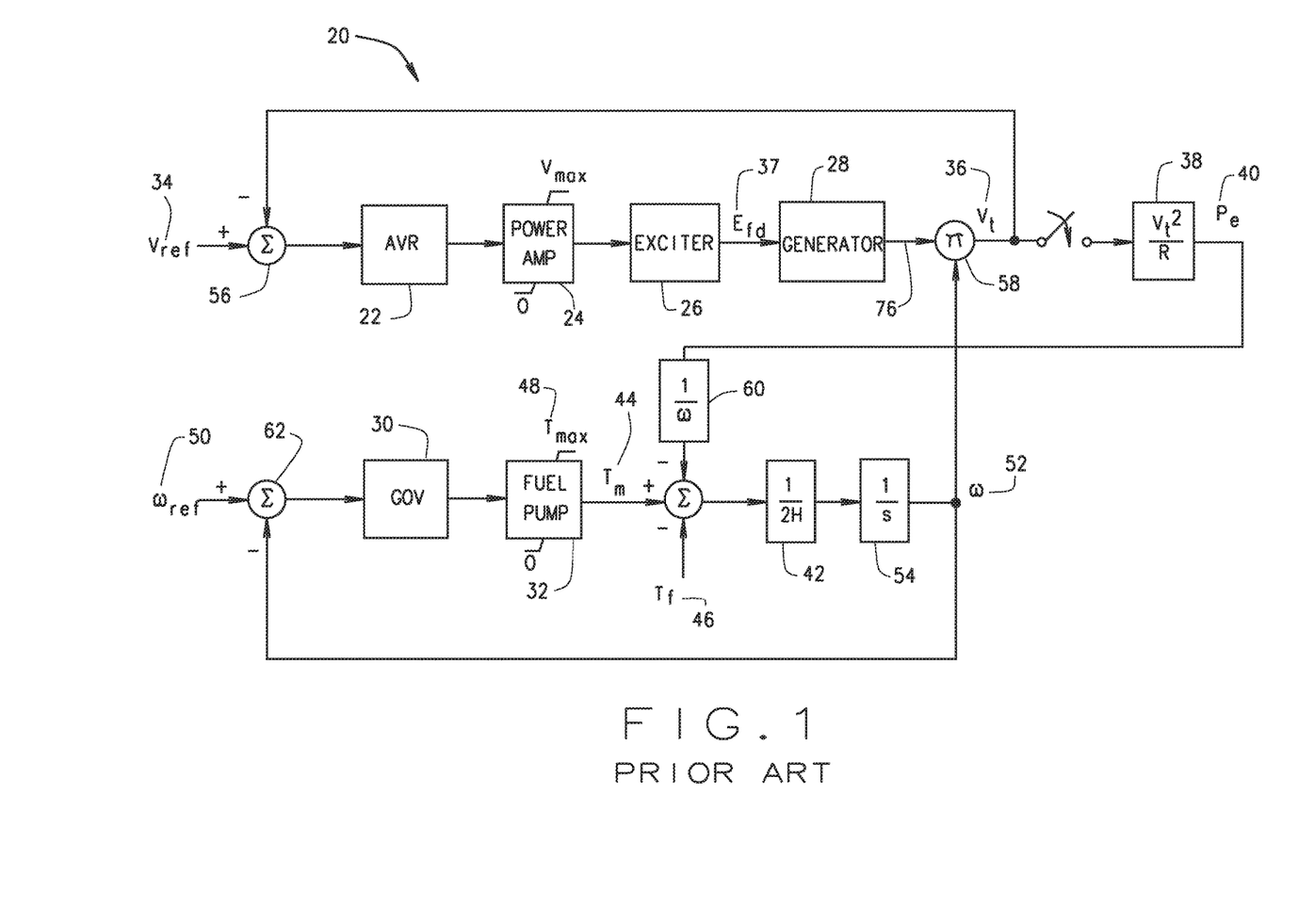
FIG. 1 shows simplified genset models with cross coupling when a restrictive load is applied.

A genset often consists of a diesel engine, a synchronous machine, and two controllers: a speed governor and an automatic voltage regulator. The synchronous machine employs a salient-pole rotor. FIG. 1 illustrates a prior art system 20 genset arrangement. Basic components of system 20 include components also indicated in FIG. 2 by the same numbers. Those components include a generator 28, an exciter 26, an automatic voltage regulator, (AVR) 22, an amplifier 24, a speed governor 30 and its related fuel pump 32. The governor 30 has been used to maintain constant generator speed $\omega$ 52. Governor 30 responds to changes in generator speed $\omega$ 52 to act as a feedback controller to control the fuel rate of the fuel pump 32 to thereby minimize deviations by a sudden change in the genset's real-power load.

In FIG. 1, $V_{ref}$ 34 is a generator voltage reference, $V_t$ 36 is the generator terminal voltage and $E_{fd}$ is exciter 26 field voltage 37. $P_e$ 40 represents the real power load, determined from $V_t^2/R$, where R is a resistive load. Further, in ½H 42, H represents the total moment of inertia of the diesel engine and generator rotating parts, $T_m$ 44 represents mechanical torque as to the diesel engine and generator rotating parts, $T_f$ 46 represents friction torque the diesel engine and generator rotating parts, $T_{max}$ 48 represents maximum torque as to the diesel engine and generator rotating, and $\omega_{ref}$ 50 is the generator speed reference, and $\omega$ 52 represents the generator speed. The "s" in the 1/s block 54 is the Laplace operator (also sometimes shown throughout the Figures as "S").

The AVR 22 maintains constant generator terminal voltage by controlling the field current to the exciter 26 through feedback control by summing 56 the generator terminal voltage $V_t$ 36 with the generator voltage reference $V_{ref}$ 34. The generator terminal voltage $V_t$ 36 is determined by multiplying 58 the generator output voltage with the generator speed $\omega$ 52. Some modern microprocessor-based AVRs are implemented with Proportional, Integral, and Derivative (PID) control for stabilization and various supplemental control systems. Such known digital regulators have used a PID controller 23 in the forward path as shown in the FIG. 1 prior art system 20 illustration. Such a PID control can be implemented within the AVR. Such prior art gensets such as shown in FIG. 1 include limiters, a var/power factor controller, tuning functionality, protection, and monitoring features, as disclosed in the article: K. Kim, M. J. Basler and A. Godhwani, "Supplemental Control in a Modern Digital Excitation System", IEEE Power Engineering Society Winter Meeting 2000, Singapore.

The real power load Pe 40 is fed to the speed control loop through the 1/$\omega$ 52, shown as block 60. The nominal value of the generator speed $\omega$ 52 is 1.0 per unit. The 1/$\omega$ block 60 clarifies the unit conversion from electric power to torque for the speed control loop. The speed control loop provides feedback control of the generator speed $\omega$ 52 by subtracting 62 the generator speed $\omega$ 52 from the generator speed reference $\omega_{ref}$ 50.

Unlike large generators, many gensets are expected to change operation from no load to full load in a single step-load application. This can cause large changes in generator speed $\omega$ 52 or stalling of the engine.

A sudden increase in the genset's real-power load causes an increased load torque on the engine. Since the load torque exceeds the engine's torque and the engine governor cannot respond instantaneously, the generator speed $\omega$ 52 decreases. After detecting this deceleration, the governor increases the fuel supplied to the engine. Since the generated voltage is proportional to generator speed $\omega$ 52, the generator output voltage decreases due to armature reaction and internal voltage drops. The voltage regulator compensates by increasing the machine's field current. FIG. 1 shows simplified genset models with cross coupling when resistive load is applied, through the interaction between voltage and speed control.

International Standard ISO8528-5, "Reciprocating Internal Combustion Engine Driven Alternating Current Generating Sets—Part 5: Specification for Generating Sets", 1993, is used to assess diesel genset performance. A genset is classified based on a series of key performance indicators. For modern gensets with a G2 classification, the maximum voltage deviation from the nominal setpoint for a sudden load acceptance shall not exceed 20%. The maximum electrical frequency deviation shall not exceed 10%. Voltage recovery time must be less than six seconds and frequency recovery time must be less than five seconds. Since real power is proportional to the square of the voltage, a fast acting AVR significantly impedes generator speed $\omega$ 52 recovery by quickly recovering the voltage; hence, placing more load on the engine.

A common way to reduce generator speed $\omega$ 52 drop is to provide an additional voltage dip during speed drops. This allows faster engine recovery by reducing real power. Various voltage setpoint adjustments (under-frequency schemes) are used in modern AVRs. A Load Adjustment Module (LAM) is also suggested in the article: K. D. Chambers, D. J. McGowan, and D. J. Morrow, "A Digital Load Relief Scheme for a Diesel Generating Set". IEEE Transactions on Energy Conversion, Vol. 13, No. 2, June 1998, incorporated herein fully by reference, which temporarily reduces voltage during a transient, and therefore aids generator speed $\omega$ 52 recovery. However, the governor's reaction to a change in generator speed $\omega$ 52 is much slower than a change to real power. Furthermore, the voltage loop is affected by the speed response because generator voltage is proportional to generator speed.

As noted above, in genset control systems the AVR 22 provides voltage regulation and the governor 30, controls the speed of the engine when the genset is operating in an island mode. However, a conventional design practice is to design the AVR and governor independently even if there is an interaction between voltage and speed control as shown in FIG. 1. Thus, it is common to have situations where this creates problems such as during a factory-load acceptance test for a manufactured genset.

Engine performance is nonlinearly affected by changes in operating speed and load. A supervisory control to consider the smoke and torque limit map was introduced, such as discussed in the publication A. R. Cooper, D. J. Morrow and K. D. R. Chambers, "Development of a Diesel Generating Set Model for Large Voltage and Frequency Transients", IEEE Transactions on Energy Conversion, Vol. 13, No. 2, June 1998. Generator speed ω 52 response to large real load is nonlinear, and it is also affected by voltage regulator response, as discussed in the said Cooper publication, and in Seung-Hwan Lee, Jung-Sik Yim, Joon-Hwan Lee and Seung-Ki Sul, "Design of Speed Control Loop of A Variable Speed Diesel Engine Generator by Electric Governor," Industry Applications Society Annual Meeting, 2008. IAS '08. IEEE, pp. 1-5, 2008.

When a large real-power load is applied, the generator speed is reduced, and consequently so is the generator voltage. Thus, the governor increases engine fueling to maximum, and the AVR increases the excitation to maintain the terminal voltage at rated value. The reaction of the AVR deteriorates the speed dip and recovery.

A conventional control system and method implements various under-frequency characteristics to improve speed performance by coordinating a trade-off between generator speed ω 52 and voltage deviation. Unfortunately, it is not easy to obtain the parameters for this approach to achieve the required performance. The AVR is designed based on linear fashion, even if the genset control systems become nonlinear as a result of interaction of the generator voltage and the generator speed ω 52 loop. Thus, using control outputs based on the linear fashion can cause overshoots in both the generator speed and voltage regulation loops.

SUMMARY OF THE INVENTION

This Application discloses an integrated control system and method which decouples the cross-coupling terms between voltage and speed control loops when rated load is applied or removed. The integrated control system disclosure comprises a Feedback Linearizing Control (FLC) subsystem that removes the cross coupling term into the voltage regulation loop. The integrated control system and method integrate the FLC subsystem with a Load Anticipation Control (LAC, also known as LAF) subsystem and method. The LAC subsystem and method acts integrally with the FLC to reduce the generator speed ω 52 deviation effectively.

BRIEF DESCRIPTION OF THE DRAWINGS

FIG. 3(*a*) shows a schematic diagram comprising a computer system suitable for use with the integrated control systems and methods, according to various embodiments of the invention, illustrating an example of the FLC subsystem, according to an exemplary embodiment;

FIG. 3(*b*) shows a schematic diagram comprising a computer system suitable for use with the integrated control systems and methods, according to various embodiments, illustrating an example of the Load Anticipation Control (LAC) Subsystem, according to an exemplary embodiment;

FIG. 4(*a*) is a graph illustrating voltage responses in a test wherein a real-power load and 0.8 PF load were applied, and a 5% voltage step was applied, illustrating the cross-coupling effect creation of oscillations in the voltage loop, according to an exemplary embodiment;

FIG. 4(*b*) is a graph illustrating voltage responses in a test wherein a real-power load and 0.8 PF load were applied, and a 5% voltage step was applied, illustrating the cross-coupling effect creation of oscillations in the speed loop, according to an exemplary embodiment;

FIG. 5(*a*) illustrates a cross coupling effect in a test when a speed step of 2% was applied with various loads, with FIG. 5(*a*) showing oscillatory responses observed in the voltage loop, according to an exemplary embodiment;

FIG. 5(*b*) illustrates a cross coupling effect in a test when a speed step of 2% was applied with various loads, with FIG. 5(*b*) showing oscillatory responses observed in the speed loop, according to an exemplary embodiment;

FIGS. 6(*a*) and 6(*b*) show comparisons of genset responses with occasion of a 100 kW load applied with FIG. 6(*a*) showing voltage responses and FIG. 6(*b*) showing speed responses, (identified as "PROPOSED"), according to an exemplary embodiment;

FIGS. 7(*a*) and 7(*b*) illustrate a comparison of generator voltage and generator speed ω 52 responses to a 100 kW sudden-load rejection with the conventional AVR scheme and proposed integrated control scheme including the FLC and LAC, (identified as "PROPOSED"), according to an exemplary embodiment;

FIGS. 8(*a*) and (*b*) illustrate a comparison of generator voltage and generator speed ω 52 responses to a 100 kW sudden-load application with a conventional AVR scheme, and three different novel control schemes—the conventional AVR with the FLC only, with the LAC only and with the FLC and the LAC (identified as "PROPOSED"), according to an exemplary embodiment;

DETAILED DESCRIPTION OF THE PREFERRED EMBODIMENT

The following description is merely exemplary in nature and is not intended to limit the present disclosure or the disclosure's applications or uses.

Figure 2:
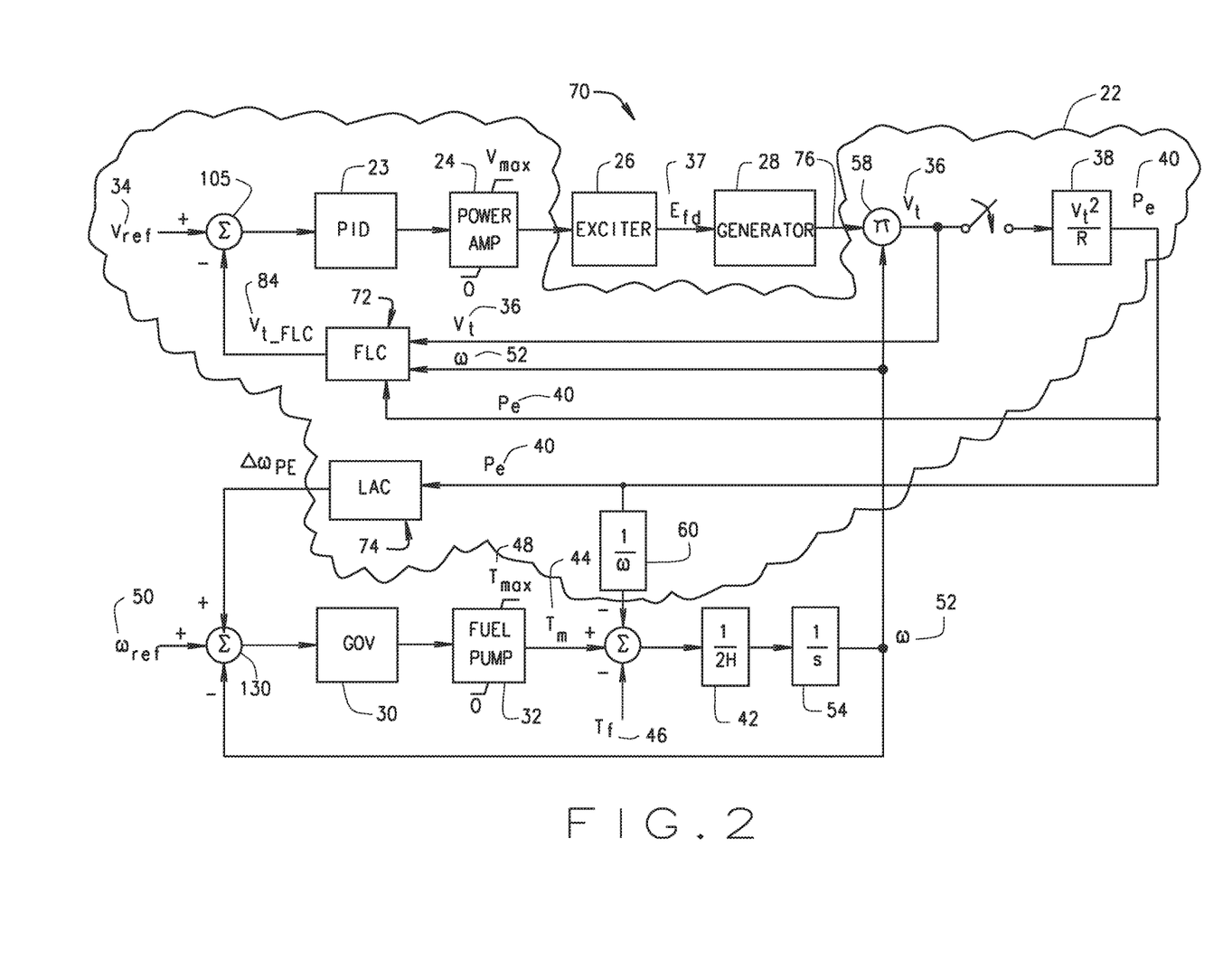
FIG. 2 illustrates a block diagram of a computer system suitable for use with the integrated control systems and methods, according to various embodiments of genset control systems, disclosing the invention, including the signal paths for the Feedback Linearizing Control (FLC) subsystem integrated with a Load Anticipation Control (LAC) Subsystem, according to an exemplary embodiment.

The inventors have developed an effective system and method to coordinate and integrate the interactions between the voltage and speed control loops to minimize the cross coupling terms. This Application discloses an integrated control system 70 as shown in FIG. 2, which decouples the cross-coupling terms between voltage and speed control loops when rated load is applied. FIG. 2 shows that the integrated control system 70 measures the change in real power and adds a feed-forward signal, proportional to the change in real power, to the governor error summing point during transient conditions.

Figure 3:
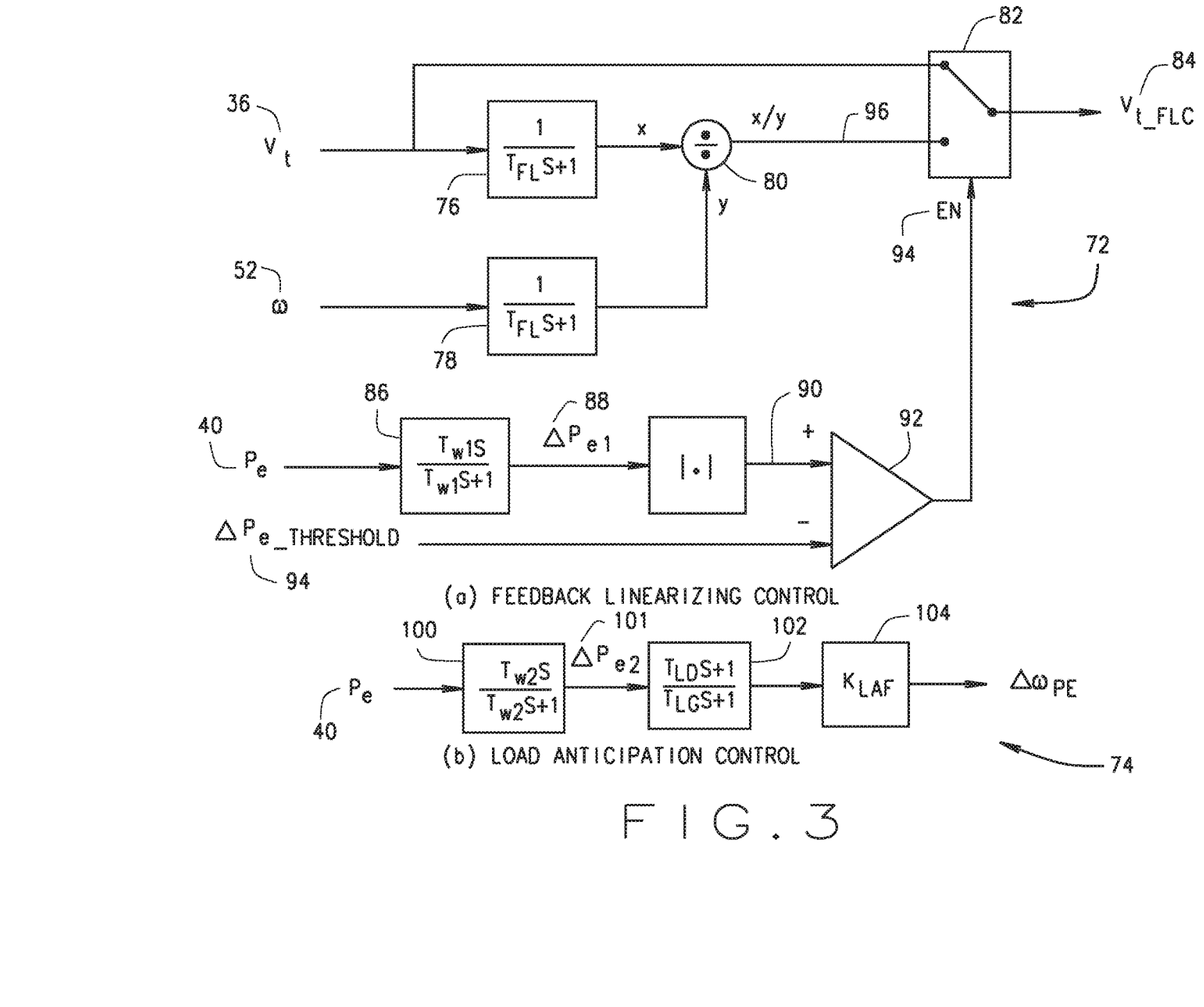

FIGS. 2 and 3 illustrate schematic diagrams comprising a computer-implemented integrated control system 70 suitable for use with the integrated control systems and methods of the invention. Each block in FIGS. 2 and 3 represents a transfer function in the Laplace operator form. In the description that follows for FIGS. 2-3, the transfer function block(s) that are described are referenced by the part or a function or effect of the physical system, or by the function of software, that those blocks represent.

FIG. 2 illustrates a Feedback Linearizing Control (FLC) subsystem 72, to remove the cross coupling term into the voltage regulation loop and a Load Anticipation Control (LAC) subsystem 74, to reduce the generator speed ω 52 effectively. FIG. 2 shows the signal paths for the said FLC subsystem 72 and LAC subsystem 74 integrated with one another, and a conventional voltage and speed control system. The integrated control system 70 can be operated alone, in combination with the FLC subsystem 72, in combination with the LAC subsystem 74, or in combination with the FLC subsystem 72 and the LAC subsystem 74.

Generally, the FLC subsystem 72 referenced in FIG. 2, and FIG. 3(a) is used to remove the nonlinearity of the voltage regulation loop, since the generator voltage, $V_t$ 36, is proportional to generator speed ω 52 with constant excitation. Nonlinearity caused by generator speed ω 52 is eliminated if the voltage deviation caused by a change in generator speed ω 52 is eliminated. This goal can be accomplished if the AVR 22 feedback signal is used with the sensed generator voltage $V_t$ 36 divided by the generator speed ω 52 in per-unit. The sensed generator voltage $V_t$ 36 can be determined by any means known in the art. Because the voltage and speed control loops are decoupled by the FLC subsystem 72, a linear response can be obtained from the voltage regulation and speed loop.

The FLC subsystem 72 is implemented by modifying the generator voltage for the AVR 22 feedback path, as illustrated in FIG. 3(a). The generator voltage $V_t$ 36 is proportional to the generator speed ω 52 when constant excitation is applied. Thus, the voltage deviation caused by a change in generator speed ω 52 is eliminated if the AVR 22 feedback signal is used with the generator terminal voltage, $V_t$ 36, is divided by the measured generator speed ω 52 in per-unit. The low pass filter 76 with time constant $T_{FL}$ and Laplace operator "S", removes the measurement noise in the generator voltage, $V_t$ 36. The time constant $T_{FL}$ of the low pass filter 76 is determined as approximately one percent of the voltage step response rise time, with values ranging from 0 to 0.1 second. The value of 0.01 was used for a generating set in the tests discussed hereafter. The filtered generator terminal voltage, $V_t$ 36, is shown as "x" in FIG. 3(a). The low-pass filter 76 can also be a finite impulse response (FIR) filter, higher order filters, or Butterworth type low pass filter. One skilled in the art will recognize that other types of filters could be used, such as a bandpass filter, and that other control schemes, such as Fuzzy Logic Control can be used to obtain similar results without departing from the scope of the present disclosure.

Since the generator speed ω 52 varies slowly, the low pass filter 78 with time constant $T_{FL}$ and Laplace operator "S", removes the measurement noise in the generator speed ω 52. The time constant $T_{FL}$ of the low pass filter 78 is determined as approximately one percent of the voltage step response rise time, with values ranging from 0 to 0.1 second. The value of 0.01 was used for a generating set in the tests discussed hereafter. Though low pass filter 76 and low pass filter 78 are shown in FIG. 3(a) as using the same time constant $T_{FL}$, one skilled in the art will recognize that these filters could use different time constant values without departing from the scope of the present disclosure. The low-pass filter 78 can also be a finite impulse response (FIR) filter, higher order filters, or Butterworth type low pass filter. One skilled in the art will recognize that other types of filters could be used, such as a bandpass filter, and that other control schemes, such as Fuzzy Logic Control can be used to obtain similar results without departing from the scope of the present disclosure.

The filtered generator speed ω 52, is shown as "y" in FIG. 3(a). The filtered generator terminal voltage, $V_t$ 36, is divided 80 by filtered generator speed ω 52 to produce the feedback linearized generator voltage, $V_{t\_FLC}$ 84, and is directed to enabling block 82.

The rate of change in generator real power ($\Delta P_{e1}$ 88) is determined using washout filter 100 having a time constant $T_{W1}$. The Time Constant $T_{W1}$ is determined to be about one percent of the required voltage loop rising time, with a recommended values from 0 to 0.1 second. The value of 0.01 was used for a generating set in the tests discussed hereafter. One skilled in the art will recognize that methods other than a washout filter, such as a low pass filter with a numerical differentiation such as $\Delta P_e = [P(t) - P(t-T_s)]/T_s$ where $T_s$ is a sampling time, that represents the rate of change of real power, for example Fuzzy Logic Control.

Next, as shown in FIG. 3(a), the absolute value of $P_{e1}$ 90 is compared at 92 with a programmable parameter $\Delta P_{e\_THRESHOLD}$ 94, which can range from 0 to 10 per unit per second. The value of 2 was used for a generating set in the tests discussed hereafter.

If $\Delta P_{e1}$ 90 is greater than $\Delta P_{e\_THRESHOLD}$ 94, then enable output 94 is true. If $\Delta P_{e1}$ 90 is not greater than $\Delta P_{e\_THRESHOLD}$ 94, then the enable output 94 is false. Thus the FLC subsystem 72 is enabled when the rate of change in generator real power is greater than a programmable amount. The FLC subsystem 72 is enabled only during transient periods of increased or decreased real power load to avoid voltage regulation errors when the generator speed ω 52 at steady-state conditions varies from rated speed. When the FLC subsystem 72 is enabled, the feedback linearized generator voltage, $V_{t\_FLC}$ 84, acts as the voltage feedback signal sent from the enabling block 96, and accordingly is thus sent from FLC subsystem 72 to the summation 105 of FIG. 2. When the FLC subsystem 72 is not enabled, the generator terminal voltage, $V_t$ 36, acts as the voltage feedback signal sent from the enabling block 96, and accordingly is thus sent from FLC subsystem 72 to the summation 105 of FIG. 2. One skilled in the art will recognize that an alternative control loop design, such that the voltage error signal is either $V_{err} = V_{ref} - V_t$ or $V_{err} = V_{ref} - V_{t\_filtered}/W_{filtered}$, or can be expressed as $V_{err} = k_1 * (V_{ref} - V_t) + k_2 * (V_{ref} - V_{t\_filtered}/W_{filtered})$ where $k_1$ and $k_2$ are adjusted to obtain similar results to the control loop shown in FIG. 2 without departing from the scope of the present disclosure.

The Load Anticipation Control (LAC) subsystem 74 referenced in FIGS. 2 and 3(b) includes features for an integrated control system to improve the speed performance for a sudden increase in the genset's real-power load disclosed in the publication Kiyong Kim and Jeff Burnworth, "Load Anticipation Feature and Its Tuning Method for a Diesel Generating Set", 2016 Clemson University Power Systems Conference, Clemson S.C. USA, 2016, as well as in U.S. Provisional Patent Application No. 62/028,653, filed on Jul. 24, 2014, and U.S. Provisional Application No. 62/033,482, filed on Aug. 5, 2014, and U.S. Non-Provisional patent application Ser. No. 14/718,504, entitled "System And Method For A Load Anticipation Feature And Its Tuning Method For A Generating Set", and well as U.S. Pat. No. 9,574,511 which issued from said provisional applications; all of which are incorporated by reference herein. A speed governor 30 reaction to a speed change due to load application is slower than a change due to real power. The real-power measurement is available in AVRs known in the art. Thus, in order to reduce the speed deviation when a large real-power load is applied, the LAC 74 is more effective than conventional approaches which change the voltage regulator setpoint based on a specific under-frequency curve.

Turning now to more specific discussion of LAC subsystem 74, the LAC subsystem 74 interacts with the FLC subsystem 72 as a controller modifier to the governor 30. The rate of change in real power, $\Delta P_{e2}$ 101, is obtained with a washout filter 100, having time constant $T_{W2}$ and Laplace operator "S." The time constant $T_{W2}$ is determined based on the speed control loop response, with values ranging from 0 to 1.0. The value of 0.4 was used for a generating set in the tests discussed hereafter.

The phase lag of the rate of change in real power ($\Delta P_{e2}$ 101) due to the governor and actuator, is compensated by the lead-lag filter 102 having phase lead constant $T_{LD}$, lag time constant $T_{LG}$, and Laplace operator "S". That compensated signal is then multiplied by the gain $K_{LAF}$ 104. That multiplied signal is then added to the governor summing point 130 (seen in FIG. 2), for a speed biasing signal using the analog output (which is available in modern voltage regulators).

The Time Constant $T_{LD}$ is the phase lead time constant of the lead-lag filter 102 and represents a time constant at the cross-over frequency of phase lead. Its value depends on the speed control loop response and has values ranging from 0 to 1.0. The value of 0.5 was used for a generating set in the tests discussed hereafter.

The Time Constant $T_{LG}$ is the phase lag time constant of lead-lag filter 102 and represents the time constant at the cross-over frequency of phase lag. It is determined based on the speed control loop response, and has values ranging from 0 to 1.0. The value of 0.01 was used for a generating set in the tests discussed hereafter.

The preferred values for the lead-lag filter 102 time constants and gain are $T_{w2}$=0.4, $T_{LD}$=0.5, $T_{LG}$=0.01 and $K_{LAF}$=0.7.

Computer Operating Environment

Figure 9:
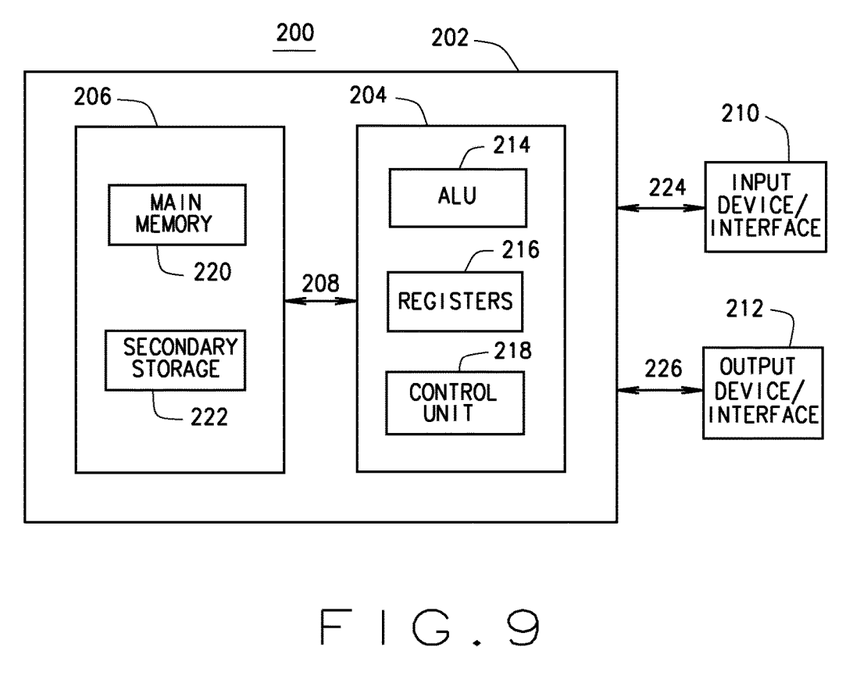
FIG. 9 is a block diagram of a computer system suitable for use with the systems and methods using the FLC and LAC subsystems and methods disclosed herein according to various embodiments.

Referring to FIG. 9, an operating environment for an illustrated embodiment of a system and/or method for an AVR or speed governor including the LAC (LAF) systems and methods as described herein is a computer system 200 with a computer 202 that comprises at least one high speed central processing unit (CPU) 204, in conjunction with a memory system 206, an input device 210, and an output device 212. These elements are interconnected by at least one bus structure 208. In an alternative embodiment, the LAF systems and methods can be implemented in a stand-alone device, or incorporated into another component in the system which provides the just-described operating environment.

The computer 202 can include an input data interface for receiving a measurement of the real power load applied to the diesel generating set, and a communications interface that can be operatively coupled to the communications interface of the speed governor 30. The communications interface of the computer 202 can transmit a control output to the communications interface of the speed governor 30.

As addressed above, the input and output devices can include a communication interface including a graphical user interface. Any or all of the computer components of the network interface and communications systems and methods can be any computing device including, but not limited to, a lap top, PDA, Cell/mobile phone, as well as potentially a dedicated device. The software can be implemented as any "app" thereon and still be within the scope of this disclosure.

The illustrated CPU 204 is of familiar design and includes an arithmetic logic unit (ALU) 214 for performing computations, a collection of registers 216 for temporary storage of data and instructions, and a control unit 218 for controlling operation of the computer system 200. Any of a variety of micro-processors are equally preferred but not limited thereto, for the CPU 204. This illustrated embodiment operates on an operating system designed to be portable to any of these processing platforms.

The memory system 206 generally includes high-speed main memory 220 in the form of a medium such as random access memory (RAM) and read only memory (ROM) semiconductor devices that are typical on a non-transient computer recordable medium. The present disclosure is not limited thereto and can also include secondary storage 222 in the form of long term storage mediums such as floppy disks, hard disks, tape, CD-ROM, flash memory, etc., and other devices that store data using electrical, magnetic, and optical or other recording media. The main memory 220 also can include, in some embodiments, a video display memory for displaying images through a display device (not shown). Those skilled in the art will recognize that the memory system 206 can comprise a variety of alternative components having a variety of storage capacities.

Where applicable, an input device 210, and output device 212 can also be provided in the system as described herein or embodiments thereof. The input device 210 can comprise any keyboard, mouse, physical transducer (e.g. a microphone), and can be interconnected to the computer 202 via an input interface 224, such as a graphical user interface, associated with or separate from the above described communication interface including the antenna interface for wireless communications. The output device 212 can include a display, a printer, a transducer (e.g. a speaker), etc., and be interconnected to the computer 202 via an output interface 226 that can include the above described communication interface including the antenna interface. Some devices, such as a network adapter or a modem, can be used as input and/or output devices.

As is familiar to those skilled in the art, the computer system 200 further includes an operating system and at least one application program. The operating system is the set of software which controls the computer system's operation and the allocation of resources. The application program is the set of software that performs a task desired by the system and method of the LAF and or any of the above described processes and process steps using computer resources made available through the operating system.

In accordance with the practices of persons skilled in the art of computer programming, the present disclosure is described below with reference to symbolic representations of operations that are performed by the computer system 200. Such operations are sometimes referred to as being computer-executed. It will be appreciated that the operations which are symbolically represented include the manipulation by the CPU 204 of electrical signals representing data bits and the maintenance of data bits at memory locations in the memory system 206, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 206.

Test Results

In order to show its effectiveness and applicability in an industrial environment, the integrated control system 20 was implemented into a commercially available voltage regulator developed for small generator sets (less than 10 MVA). This type of cost-effective regulator has limited memory and computation power. This microprocessor-based voltage regulator includes signal conditioning circuits for generator voltage, current, and a Pulse Width Modulated (PWM) regulator output. Generator voltage and current were sampled with 12-bit resolution after anti-aliasing filters. The rms calculation of generator voltage was performed every quarter cycle (4.16 ms for a 60-hertz system).

The proposed disclosed systems and methods were tested using a commercial, digital regulator on a turbo-charged diesel genset with a 125 kVA, 208 Vac, 1,800 rpm, three-phase synchronous generator. The no-load excitation for this generator was provided by a self-excited 0.3 Adc, 7 Vdc, ac exciter.

An IEEE type AC8B excitation system was used. Its PID gains were $K_{PR}=5$, $K_{IR}=10$, $K_{DR}=0.2$, $T_{DR}=0.01$, and $K_A=0.2$. The standard under-frequency roll-off characteristic was also selected.

Figure 4A:
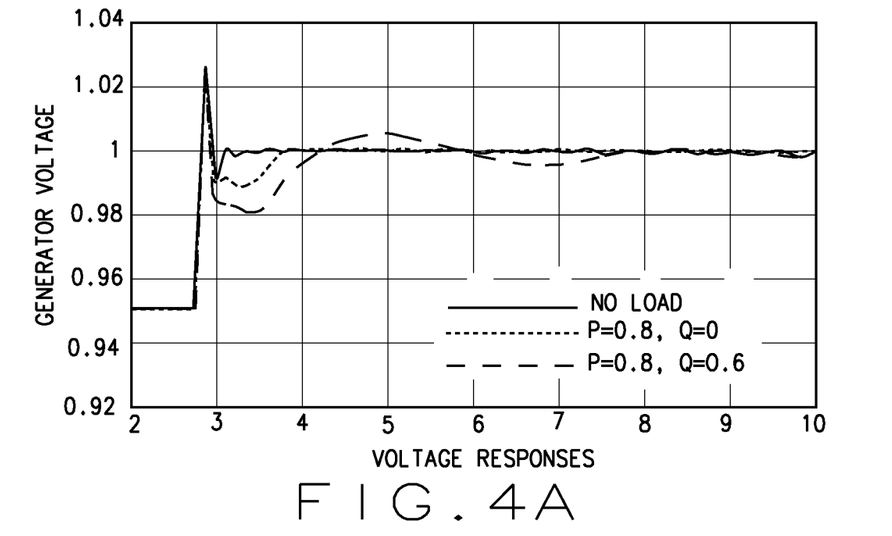
Figure 4B:
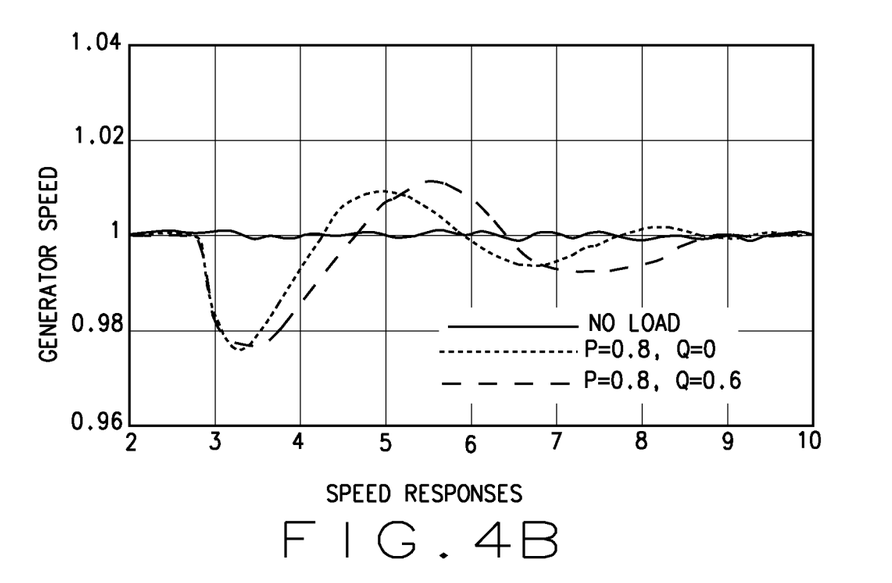
Figure 5A:
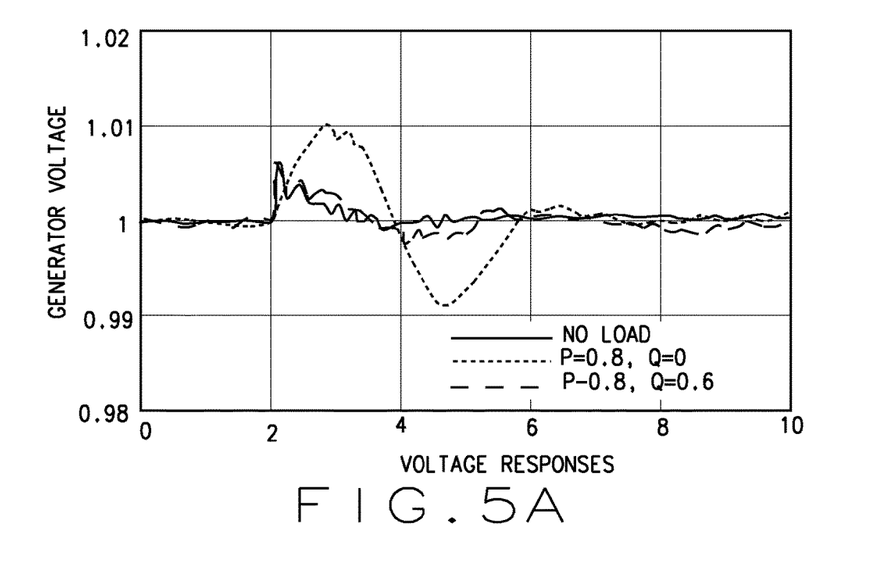
Figure 5B:
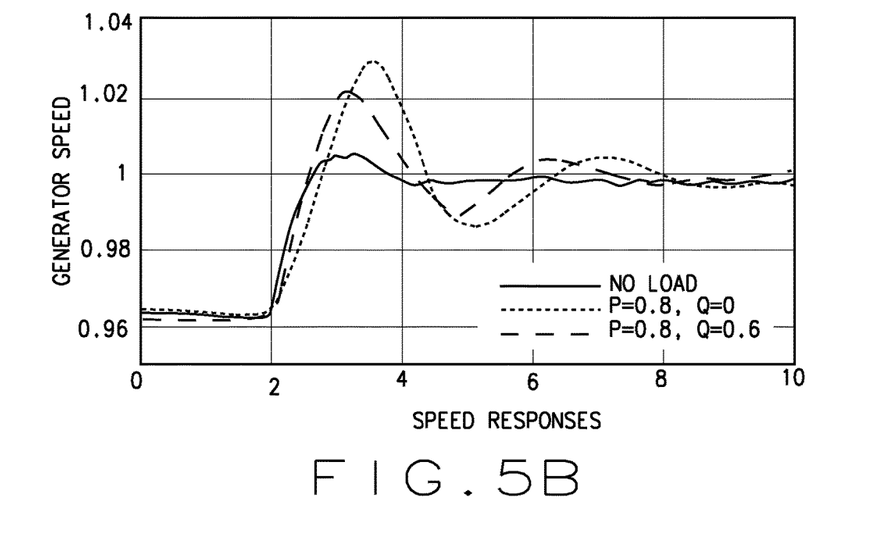

In order to investigate the cross-coupling effect, 5% voltage step was applied while a load was connected. In FIGS. 4 and 5, "P" and "Q" represent the well-known symbols for real power and reactive power, respectively. FIG. 4 shows no variation in generator speed when no load was applied. However, when load was applied, the cross-coupling effect created oscillations in both the voltage loop (FIG. 4-*a*) and speed loop (FIG. 4-*b*).

FIG. 5 shows the generator voltage and generator speed ω 52 responses when a speed step of 2% was applied to the governor setpoint adjustment with load connected. Speed response, with no load applied, reveals that the governor is well tuned. However, when load is applied, oscillatory responses were observed in the voltage loop (FIG. 5(*a*) and the speed loop (FIG. 5(*b*)). It is apparent that these oscillations were created by the cross-coupling terms.

Figure 6A:
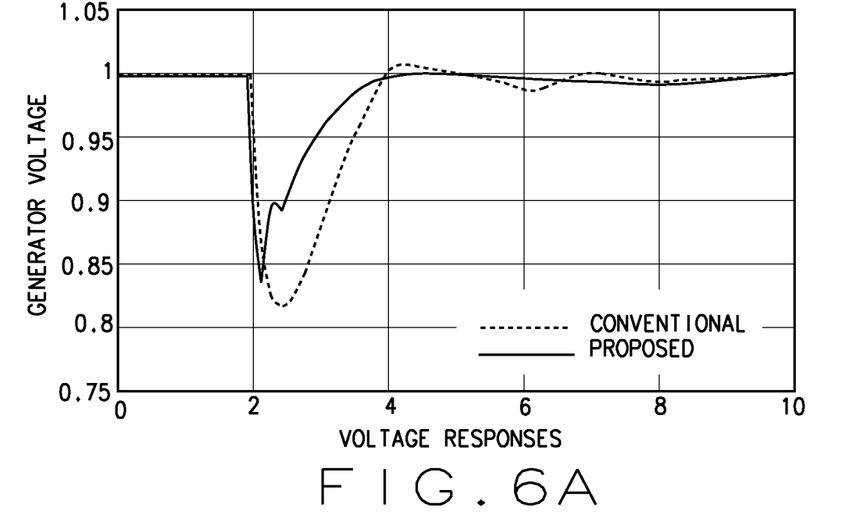
Figure 6B:
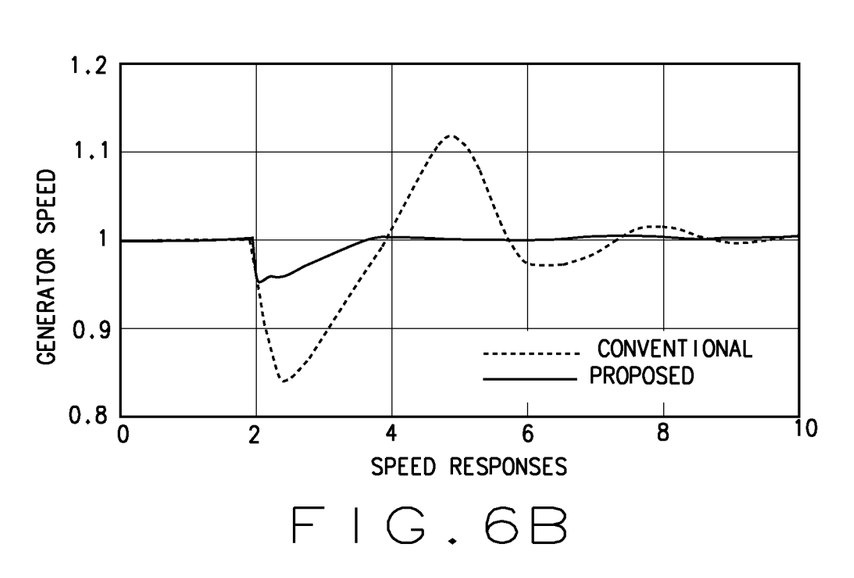

FIGS. 6(*a*) and 6(*b*) illustrate a comparison of generator voltage and generator speed ω 52 responses to a 100 kW sudden-load application with a conventional (prior art) AVR system and method, and an integrated control system and method of the present disclosure. FIG. 6(*b*) illustrates that, for this particular 100 kW load step, with the conventional AVR employed, the generator speed ω 52 deviates beyond the maximum permissible IS08528-5 G2 limit. This evidences that with the subject integrated control system and method, the maximum voltage and generator speed ω 52 deviations can be significantly reduced in comparison to the conventional AVR system and method.

Figure 7A:
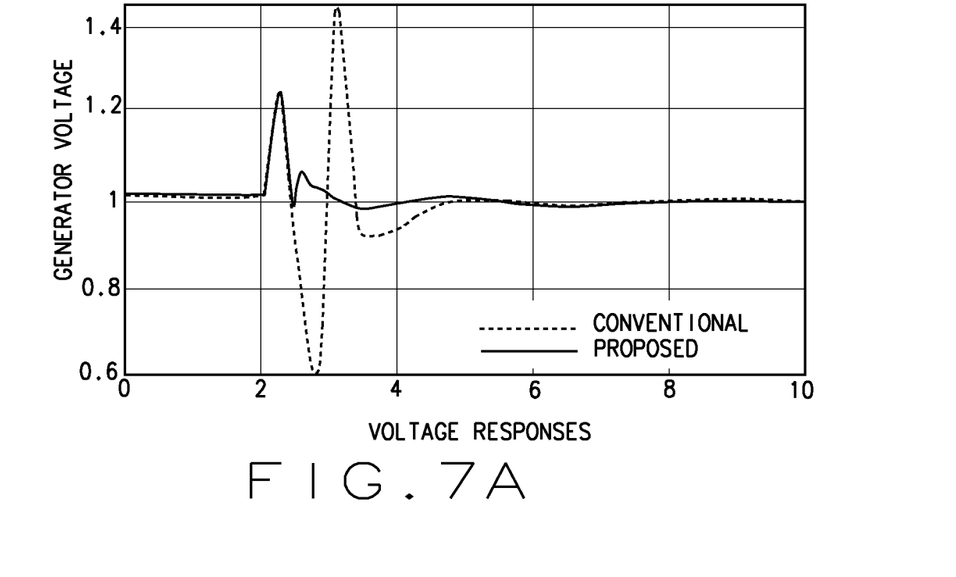
Figure 7B:
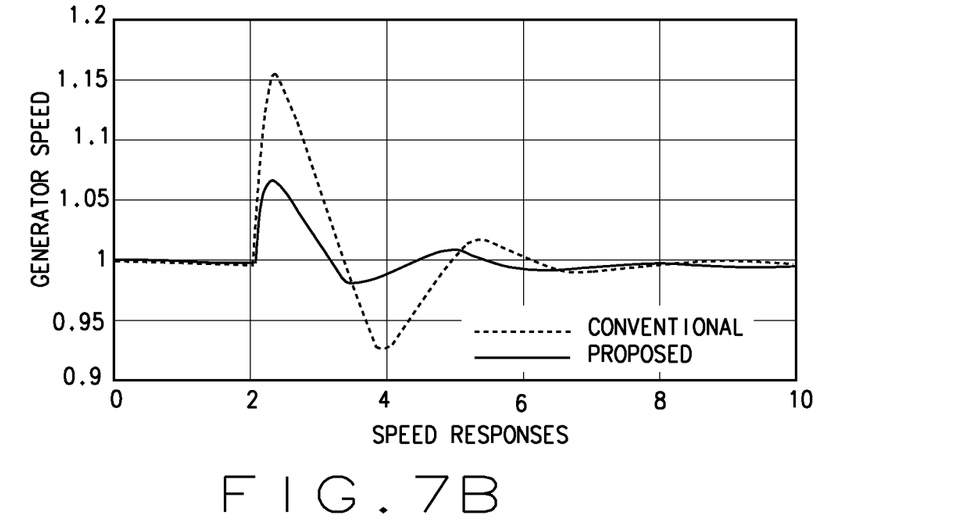

FIGS. 7(*a*) and 7(*b*) presents a comparison of generator voltage and generator speed ω 52 responses with a conventional (prior art) AVR system and method, and the integrated control system and method of the present invention, when a 100 kW sudden load is rejected. It is apparent that this present Application's integrated control system and method is superior to the prior art, and effective for load rejection.

Figure 8A:
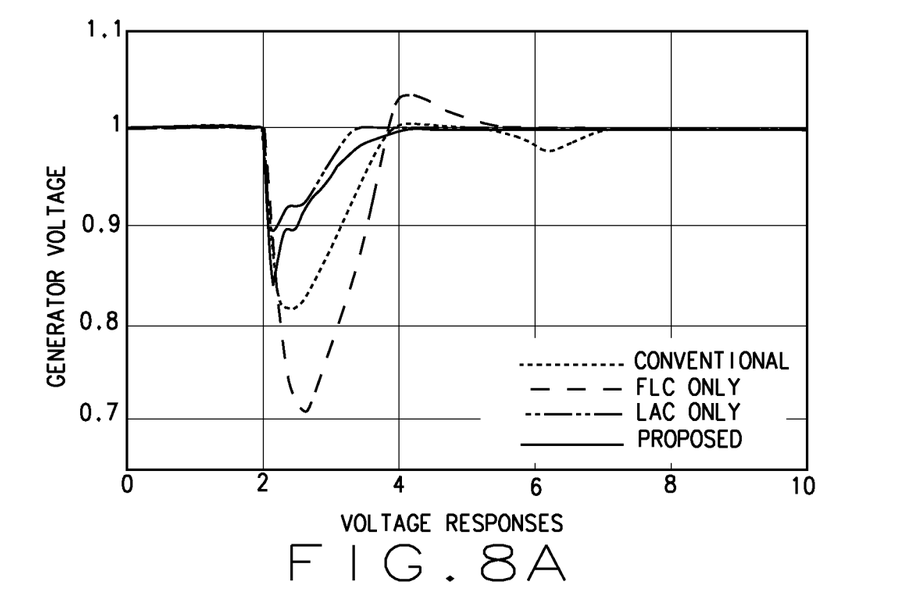
Figure 8B:
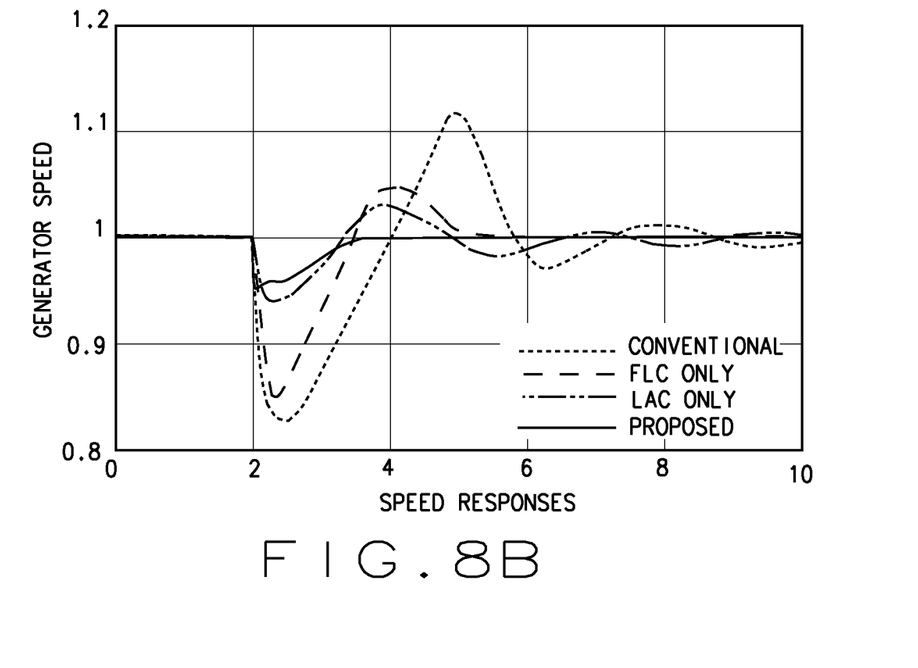

FIGS. 8(*a*) and 8(*b*) illustrate a comparison of generator voltage and generator speed ω 52 responses to a 100 kW sudden-load application with a conventional (prior art) AVR scheme, and three different control system and methods. FIG. 8, illustrates evidence that speed deviation is effectively reduced by LAC and oscillation behavior. This is because the coupling effect can be reduced by FLC. The best voltage and speed performances were obtained when both the LAC and FLC controls of the present disclosure were used.

The above discussed load-testing results show that the integrated control system and method of the Applicant's disclosure easily achieves improved responses in both generator voltage and generator speed ω 52 deviation. The FLC can achieve improved damping of the large overshoot due to the cross-coupling effect. The LAC effectively improves generator speed ω 52 recovery after a large change in load. The integrated control system and method of the present disclosure offers enhanced generator voltage regulation during the transient and genset load acceptance performance with larger load steps.

With an integrated control system and method of the present disclosure, commissioning of a factory-load acceptance test for a manufactured genset can be quickly accomplished with excellent performance results.

The foregoing disclosure thus discloses multiple systems and methods which can be made up of various elements and steps which may or may not be present in any particular system or method to be used at particular time or in a particular setting, and thus discloses many permutations of systems and methods. The foregoing disclosure allows for variation and selection of features, elements and steps depending upon the user or users.

The invention claimed is:

1. A method for controlling a diesel generating set including a diesel engine, a generator having a terminal voltage and a generator output voltage magnitude and frequency response, an exciter having an exciter field voltage, a speed governor having a generator speed reference and a first communications interface, and an automatic voltage regulator having a generator reference voltage and a second communications interface, the method comprising steps of:
   determining, by the automatic voltage regulator, a voltage feedback control output voltage based on the terminal voltage of the generator by a speed of the generator;
   controlling the exciter field voltage, by the automatic voltage regulator, by modifying the generator reference voltage by the voltage feedback control output voltage;
   measuring, by the automatic voltage regulator, a real power output of the generator;
   determining, by the automatic voltage regulator, a rate of change of the generator real power output;
   determining, by the automatic voltage regulator, a speed feedback control output based on rate of change of the generator real power output;
   transmitting, by the automatic voltage regulator, through the first communications interface, the speed feedback control output to the speed governor;
   receiving, by the speed governor, the speed feedback control output from the automatic voltage regulator;
   adjusting, by the speed governor, the speed of the diesel engine by modifying the generator speed reference based on the speed feedback control output; and
   minimizing, by the automatic voltage regulator, variations of the generator output voltage magnitude and frequency response from nominal by determining the speed feedback control output in conjunction with the voltage feedback control output.

2. The method of claim 1 wherein the step of determining, by the automatic voltage regulator, a voltage feedback control output voltage based on the terminal voltage of the generator by a speed of the generator further comprises the steps of:
measuring a terminal voltage of the generator of the diesel generating set;
measuring a speed of the generator of the diesel generating set;
filtering the terminal voltage of the generator;
filtering the speed of the generator; and
determining, by the automatic voltage regulator, a voltage feedback control output voltage based on the filtered terminal voltage of the generator by the filtered speed of the generator.

3. The method of claim 1 wherein the step of determining, by the automatic voltage regulator, a speed feedback control output based on rate of change of the generator real power output further comprises the steps of:
measuring a real power output of the generator;
determining a rate of change of the generator real power output by filtering the measured generator real power output; and
determining the phase lag of the rate of change of the generator real power output by filtering the rate of change of the generator real power output.

4. The method of claim 1 further comprising steps of:
generating an enable output from an absolute value of the rate of change of the generator real power output and a predetermined threshold, wherein the enable output is true when the absolute value of the rate of change of the generator real power output exceeds the predetermined threshold and is false otherwise; and
blocking the voltage feedback control output voltage when the enable output is false.

5. The method of claim 2 wherein the step of filtering the terminal voltage of the generator further comprises filtering the terminal voltage of the generator with a filter selected from a lowpass filter or a bandpass filter.

6. The method of claim 2 wherein the step of filtering the speed of the generator further comprises filtering the speed of the generator with a filter selected from a lowpass filter or a bandpass filter.

7. The method of claim 2 wherein the step of filtering the terminal voltage of the generator further comprises using Fuzzy Logic control to determine the filtered terminal voltage of the generator.

8. The method of claim 2 wherein the step of filtering the speed of the generator further comprises using Fuzzy Logic control to determine the filtered speed of the generator.

9. The method of claim 3 wherein the step of determining the phase lag of the rate of change of the generator real power output by filtering the rate of change of the generator real power output comprises filtering the rate of change of the generator real power output with a lead-lag filter.

10. The method of claim 3 wherein the step of determining a rate of change of the generator real power output by filtering the measured generator real power output comprises filtering the measured generator real power output with a filter selected from a washout filter or a low pass filter.

11. The method of claim 3 wherein the step of determining a rate of change of the generator real power output by filtering the measured generator real power output comprises a numerical differentiation based on a current value of the generator real power output, and previous value of the generator real power output based on a sampling time.

12. The method of claim 3 wherein the step of determining the phase lag of the rate of change of the generator real power output by filtering the rate of change of the generator real power output comprises using Fuzzy Logic control to determine the filtering the rate of change of the generator real power output.

13. The method of claim 3 wherein the step of determining a rate of change of the generator real power output by filtering the measured generator real power output comprises using Fuzzy Logic control to determine the filtered measured generator real power output.

14. A method for controlling a diesel generating set including a diesel engine, a generator, an exciter having an exciter field voltage, a speed governor having a generator speed reference, and an automatic voltage regulator having a generator reference voltage, the method comprising steps of:
measuring a terminal voltage of the generator of the diesel generating set;
measuring a speed of the generator of the diesel generating set;
filtering the terminal voltage of the generator by a first low-pass filter having a first time constant;
filtering the speed of the generator by a second low-pass filter having a second time constant;
determining, by the automatic voltage regulator, a voltage feedback control output voltage based on the filtered terminal voltage of the generator by the filtered rotational speed of the generator;
controlling the exciter field voltage, by the voltage regulator, by modifying the generator reference voltage by the voltage feedback control output voltage;
measuring a real power output of the generator;
determining a rate of change of the generator real power output by filtering the measured generator real power output by a washout filter having a washout time constant;
determining the phase lag of the rate of change of the generator real power output by filtering the rate of change of the generator real power output by a lead-lag filter having a phase lead time constant and a phase lag time constant;
determining, by the automatic voltage regulator, a speed feedback control signal by amplifying the phase lag of the rate of change of the generator real power output by a predetermined gain;
transmitting, by the automatic voltage regulator, through the first communications interface, the speed feedback control output to the speed governor;
receiving, by the speed governor, the speed feedback control output from the automatic voltage regulator;
adjusting, by the speed governor, the speed of the diesel engine by modifying the generator speed reference based on the speed feedback control output; and
minimizing, by the automatic voltage regulator, variations of the generator output voltage magnitude and frequency response from nominal by determining the speed feedback control output in conjunction with the voltage feedback control output.

15. The method of claim 14 further comprising steps of:
generating an enable output from an absolute value of the rate of change of the generator real power output and a predetermined threshold, wherein the enable output is true when the absolute value of the rate of change of the generator real power output exceeds the predetermined threshold and is false otherwise; and blocking the voltage feedback control output voltage when the enable output is false.

16. A system for controlling a diesel generating set including a diesel engine, a generator having a terminal voltage and a generator output voltage magnitude and frequency response, an exciter having an exciter field voltage, a speed governor having a generator speed reference and a first communications interface, and an automatic voltage regulator having a generator reference voltage and a second communications interface, the system comprising:

a computer data processor apparatus operatively coupled to a non-transitory computer memory containing computer executable instructions, that when executed by one or more processors, cause the one or more processors to:

determine, by the automatic voltage regulator, a voltage feedback control output voltage based on the terminal voltage of the generator by a speed of the generator;

control the exciter field voltage, by the automatic voltage regulator, by modifying the generator reference voltage by the voltage feedback control output voltage;

measure, by the automatic voltage regulator, a real power output of the generator;

determine, by the automatic voltage regulator, a rate of change of the generator real power output;

determine, by the automatic voltage regulator, a speed feedback control output based on rate of change of the generator real power output;

transmit, by the automatic voltage regulator, through the first communications interface, the speed feedback control output to the speed governor;

receive, by the speed governor, the speed feedback control output from the automatic voltage regulator;

adjust, by the speed governor, the speed of the diesel engine by modifying the generator speed reference based on the speed feedback control output; and minimize, by the automatic voltage regulator, variations of the generator output voltage magnitude and frequency response from nominal by determining the speed feedback control output in conjunction with the voltage feedback control output.

17. The system of claim 16 wherein the computer executable instructions that when executed by one or more processors, cause the one or more processors to:

measure a terminal voltage of the generator of the diesel generating set;

measure a speed of the generator of the diesel generating set;

filter the terminal voltage of the generator;

filter the speed of the generator; and determine, by the automatic voltage regulator, a voltage feedback control output voltage based on the filtered terminal voltage of the generator by the filtered speed of the generator.

18. The system of claim 16 wherein the computer executable instructions that when executed by one or more processors, cause the one or more processors to:

determine a real power output of the generator;

determine a rate of change of the generator real power output by filtering the measured generator real power output; and determine the phase lag of the rate of change of the generator real power output by filtering the rate of change of the generator real power output.

19. The system of claim 16 wherein the computer executable instructions that when executed by one or more processors, cause the one or more processors to:

generate an enable output from an absolute value of the rate of change of the generator real power output and a predetermined threshold, wherein the enable output is true when the absolute value of the rate of change of the generator real power output exceeds the predetermined threshold and is false otherwise; and block the voltage feedback control output voltage when the enable output is false.

20. The system of claim 17 wherein the terminal voltage of the generator is filtered with a filter selected from a lowpass filter or a bandpass filter.

21. The system of claim 17 wherein the speed of the generator is filtered with a filter selected from a lowpass filter or a bandpass filter.

22. The system of claim 17 wherein the terminal voltage of the generator is determined using Fuzzy Logic control to determine the filtered terminal voltage of the generator.

23. The system of claim 17 wherein the step of filtering the speed of the generator is determined using Fuzzy Logic control.

24. The system of claim 18 wherein the rate of change of the generator real power output is filtered with a lead-lag filter.

25. The system of claim 18 wherein the measured generator real power output is filtered with a filter selected from a washout filter or a low pass filter.

26. The system of claim 18 wherein the filtered measured generator real power output is determined from a numerical differentiation based on a current value of the generator real power output, and previous value of the generator real power output based on a sampling time.

27. The system of claim 18 wherein the phase lag of the rate of change of the generator real power output is determined using Fuzzy Logic control.

28. The system of claim 18 wherein the filtered measured generator real power output is determined using Fuzzy Logic control.

29. A system for controlling a diesel generating set including a diesel engine, a generator, an exciter having an exciter field voltage, a speed governor having a generator speed reference, and an automatic voltage regulator having a generator reference voltage, the system comprising:

a computer data processor apparatus operatively coupled to a non-transitory computer memory containing computer executable instructions, that when executed by one or more processors, cause the one or more processors to:

measure a terminal voltage of the generator of the diesel generating set;

measure a speed of the generator of the diesel generating set;

filter the terminal voltage of the generator by a first low-pass filter having a first time constant;

filter the speed of the generator by a second low-pass filter having a second time constant;

determine, by the automatic voltage regulator, a voltage feedback control output voltage based on the filtered terminal voltage of the generator by the filtered rotational speed of the generator;

control the exciter field voltage, by the voltage regulator, by modifying the generator reference voltage by the voltage feedback control output voltage;

measure a real power output of the generator;

determine a rate of change of the generator real power output by filtering the measured generator real power output by a washout filter having a washout time constant;

determine the phase lag of the rate of change of the generator real power output by filtering the rate of change of the generator real power output by a lead-lag filter having a phase lead time constant and a phase lag time constant;

determine, by the automatic voltage regulator, a speed feedback control signal by amplifying the phase lag of the rate of change of the generator real power output by a predetermined gain;

transmit, by the automatic voltage regulator, through the first communications interface, the speed feedback control output to the speed governor;

receive, by the speed governor, the speed feedback control output from the automatic voltage regulator;

adjust, by the speed governor, the speed of the diesel engine by modifying the generator speed reference based on the speed feedback control output; and minimize, by the automatic voltage regulator, variations of the generator output voltage magnitude and frequency response from nominal by determining the speed feedback control output in conjunction with the voltage feedback control output.

30. The system of claim 29 wherein the computer executable instructions that when executed by one or more processors, cause the one or more processors to:

generate an enable output from an absolute value of the rate of change of the generator real power output and a predetermined threshold, wherein the enable output is true when the absolute value of the rate of change of the generator real power output exceeds the predetermined threshold and is false otherwise; and block the voltage feedback control output voltage when the enable output is false.

* * * * *